United States Patent
Bangerter et al.

(10) Patent No.: US 10,497,249 B2
(45) Date of Patent: Dec. 3, 2019

(54) PERSONAL EMERGENCY RESPONSE SYSTEM

(71) Applicant: Mytrex, Inc., South Jordan, UT (US)

(72) Inventors: Richard M. Bangerter, South Jordan, UT (US); Ryan R. Bangerter, South Jordan, UT (US); Eric L. Mattle, South Jordan, UT (US); Jared H. Wood, Sandy, UT (US); Brett J. Hibbert, South Jordan, UT (US); Joseph A. Sterzer, Eagle Mountain, UT (US); Lynn H. Salisbury, South Jordan, UT (US); Michael M. Bangerter, Bluffdale, UT (US); Steven Alex Sandoval, Herriman, UT (US); Zachary W. Parduhn, Herriman, UT (US); Andres Gonzalez, Draper, UT (US); Jay R. Peterson, South Jordan, UT (US); Joshua J. Bangerter, South Jordan, UT (US); Richard S. Kasper, Kearns, UT (US)

(73) Assignee: Mytrex, Inc., South Jordan, UT (US)

( * ) Notice: Subject to any disclaimer, the term of this patent is extended or adjusted under 35 U.S.C. 154(b) by 68 days.

(21) Appl. No.: 15/802,358

(22) Filed: Nov. 2, 2017

(65) Prior Publication Data
US 2018/0130336 A1 May 10, 2018

Related U.S. Application Data

(60) Provisional application No. 62/416,238, filed on Nov. 2, 2016.

(51) Int. Cl.
*H04M 11/04* (2006.01)
*G08B 25/01* (2006.01)
(Continued)

(52) U.S. Cl.
CPC ............ *G08B 25/016* (2013.01); *H04M 1/57* (2013.01); *H04M 1/72541* (2013.01); *H04W 4/90* (2018.02)

(58) Field of Classification Search
CPC .. G08B 25/016; G08B 21/0446; G08B 21/02; G08B 21/0423; G08B 21/0453;
(Continued)

(56) References Cited

U.S. PATENT DOCUMENTS 5,894,591 A 4/1999 Tamayo
10,198,932 B2 * 2/2019 Ledingham .......... G08B 25/016
(Continued)

OTHER PUBLICATIONS

PCT Application No. PCT/US2017/059790, Filing Date Nov. 2, 2017, Richard Bangerter, International Search Report, dated Feb. 13, 2018, 10 Pages.

*Primary Examiner* — David Q Nguyen
(74) *Attorney, Agent, or Firm* — Thorpe North & Western

(57) ABSTRACT

Technology for an enhanced personal emergency response system (e-PERS) unit is disclosed. The e-PERS unit can transmit a general message related to a personal emergency to a personal emergency response system (PERS) computing service environment (CSE), wherein the general message includes an identification (ID) of the e-PERS unit to enable the e-PERS CSE to send the ID of the e-PERS unit to a monitoring station. The e-PERS unit can receive a unit profile message from the e-PERS CSE. The e-PERS unit can: open a voice channel to the monitoring station in response to receiving the general message from the e-PERS CSE, or receive a voice call from the monitoring station in response to receiving the ID of the e-PERS unit at the monitoring station. The e-PERS unit can include a display screen and a base unit help button.

23 Claims, 10 Drawing Sheets

(51) Int. Cl.
*H04M 1/57* (2006.01)
*H04M 1/725* (2006.01)
*H04W 4/90* (2018.01)

(58) Field of Classification Search
CPC ............ G08B 21/0461; G08B 21/0476; G08B 21/0484; G08B 21/0492; G08B 21/043; G08B 25/10; G08B 21/0286; G08B 25/12; G08B 29/12; G08B 29/185
USPC ............... 455/404.1, 404.2; 340/539.12, 540
See application file for complete search history.

(56) References Cited

U.S. PATENT DOCUMENTS

| | | | |
|---|---|---|---|
| 2007/0103317 | A1 | 5/2007 | Zellner et al. |
| 2009/0160643 | A1* | 6/2009 | Lizza ................. G08B 21/0415 340/540 |
| 2009/0321291 | A1* | 12/2009 | Asla ...................... A45C 11/00 206/320 |
| 2011/0298613 | A1 | 12/2011 | Ayed |
| 2012/0092157 | A1* | 4/2012 | Tran .................... G06F 19/3418 340/539.12 |
| 2014/0316792 | A1* | 10/2014 | Siddiqui ............. G06F 19/3418 705/2 |
| 2015/0334545 | A1 | 11/2015 | Maier et al. |
| 2016/0094967 | A1* | 3/2016 | Sulaiman ................ H04W 4/70 455/404.2 |
| 2016/0307436 | A1 | 10/2016 | Nixon |
| 2017/0169689 | A1* | 6/2017 | Vagelos ............... G08B 21/043 |

\* cited by examiner

PERSONAL EMERGENCY RESPONSE SYSTEM

RELATED APPLICATIONS

The present application claims priority to U.S. Provisional Patent Application No. 62/416,238, filed Nov. 2, 2016, with the entire specification of which is hereby incorporated by reference in its entirety for all purposes.

BACKGROUND

Personal Emergency Response Systems (PERS) can be used by persons with health issues to call for help in an emergency. A typical PERS unit can include a base unit with a simple user interface, such as a button, which can be activated in the event of an emergency. A typical PERS can also include a personal help button worn on the user to communicate with the PERS unit. The personal help button can activate the base unit to call a Central Station (Response Center) for help. Personal help buttons are typically worn by a person to enable the person to call for help if nobody else is around. The personal help button can include a radio transmitter that can be used to send a signal. The signal may be sent to the base unit, which can then be sent to an emergency response center that monitors the PERS. The radio transmitter may allow the user to communicate with the emergency response center, and inform them about the emergency. The emergency response center can then offer assistance to the user, if necessary.

Modern healthcare has become increasingly expensive. To reduce costs, more and more healthcare and recovery is performed in the home. Enhancements to a PERS can allow the PERS to be more useful to the user, caregivers, dealers, as well as to home healthcare providers.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
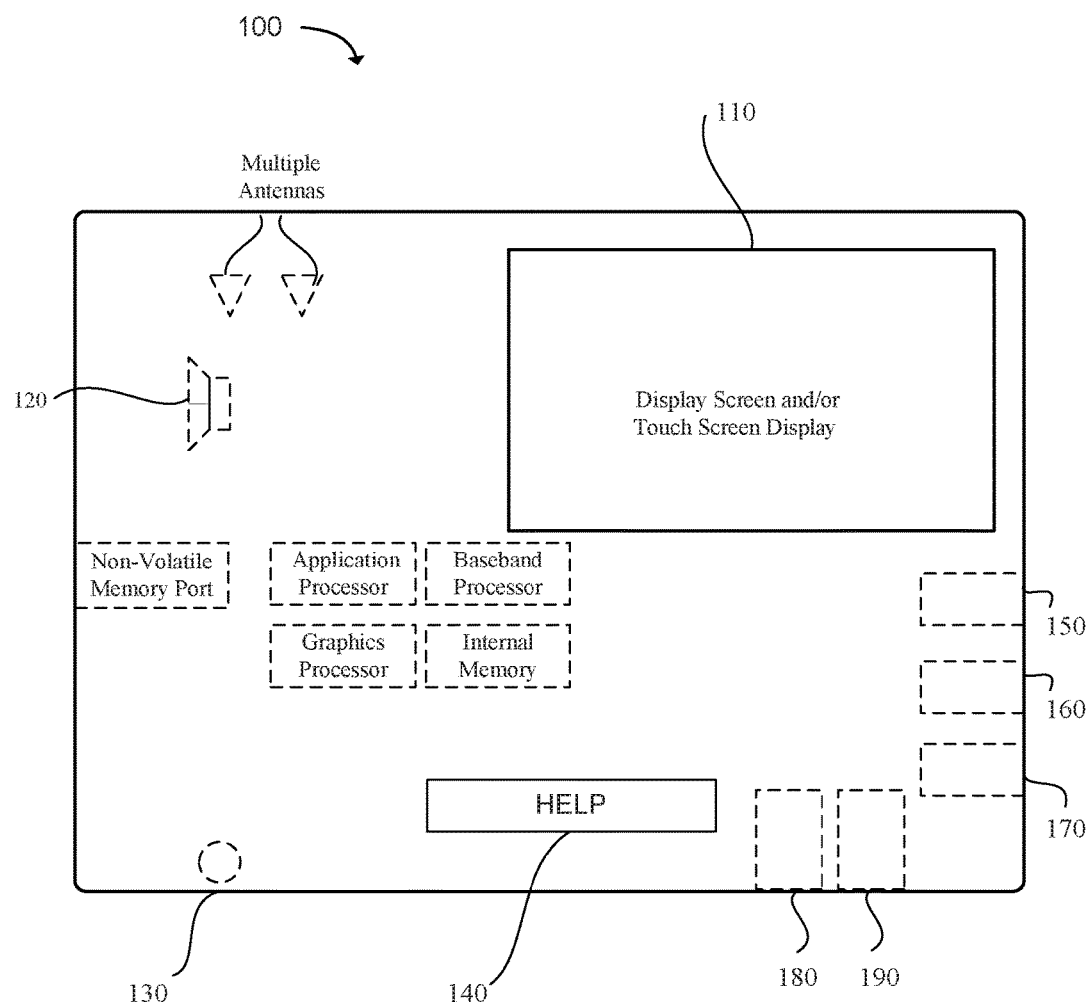
FIG. 1 illustrates an enhanced personal emergency response system (e-PERS) unit in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A legacy personal emergency response system (PERS) unit can comprise a console that can communicate with a monitoring center through two-way voice and data signaling. It can be activated by a transmitter worn on a person. The legacy PERS unit communication with the monitoring center can require a multi-operation process that can take more than 15 seconds to execute. The process can include: the dialing of a phone to contact the monitoring center; a handshake message sent from the monitoring center back to the legacy PERS unit; the sending of (dual-tone multi-frequency) DTMF commands from the legacy PERS unit to the monitoring station; and finally, the initialization of the two-way voice call between the legacy PERS unit and the monitoring station. At this point, which typically takes 15 or more seconds, the monitoring center can respond to a potential personal emergency.

The legacy PERS unit presents several problems. First, it takes a longer time than necessary to send an alert to a monitoring station relating to a personal emergency. The legacy PERS unit can take longer than 15 seconds to execute when it is operating correctly. If the legacy PERS unit encounters problems with communicating with the monitoring station, then this time period can be even longer. Second, if the legacy PERS unit is unable to communicate with the monitoring station via the legacy means of communication, then the legacy PERS unit might not be able to inform the monitoring station that a personal emergency is occurring. Because a personal emergency can become increasingly harmful as the amount of time elapses, it is desirable to increase the speed and the number of ways in which a PERS unit can communicate with the monitoring station.

The typical legacy PERS unit also has a deficient design that does not allow for the expansion of functionality. A user might not be able to determine the functionality of a PERS unit that would optimize a user's experience. For example, the user might want wireless wide area network (W-WAN) connectivity by itself, without wireless local area network (W-LAN) connectivity, or vice versa. Or the user might want to expand the capabilities of the PERS unit.

It can also be difficult to pair a personal help button with a legacy PERS base unit.

In addition, the legacy PERS units are simple in their functionality and do not allow for some typical social networking features including the sending and receiving of video, audio, and text with family members, care givers, or emergency responders. Because of this deficiency in the legacy PERS units, the user is not motivated to keep track of his or her PERS unit. In addition, the legacy PERS unit is often avoided by potential users until after they have had an accident. Consequently, the PERS unit might not be available when the user has a personal emergency.

The legacy PERS unit can be enhanced to address these problems. The enhanced PERS (e-PERS) unit (i.e. base unit) can interface with a computing service environment (CSE), and the CSE can interface with a monitoring center. Communication through the CSE can shorten the amount of time between the triggering of the alarm and the response of the monitoring center to the potential personal emergency.

The e-PERS unit can also have a modular design which allows for the expansion of functionality. For example, the user can use wireless wide area network (W-WAN) connectivity by itself, without wireless local area network (W-LAN) connectivity, or vice versa. Or the user might want to expand the capabilities of the e-PERS unit. The user can also use dual-connectivity to avoid problems with signal strength of a specific radio access technology (RAT).

The e-PERS, through its interface with the computing service environment, can allow for remote programming or pairing of a personal help button. Some users can find it difficult to program or pair a personal help button to function with a particular PERS base unit. A user can program or pair the personal help button from a web portal associated with the computing service environment. Or the user or monitoring center can set the e-PERS unit to enter a programming mode to enable the personal help button to be paired by the monitoring center, without the need for assistance by the user.

The e-PERS unit can also be enhanced to provide for social networking with family members. By expanding the functionality of a PERS unit to include desirable elements to potential users, such as social media aspects, users can be motivated to purchase a PERS before they have an accident. This can provide the user with additional incentives to purchase and use the e-PERS unit which can increase the chances that the e-PERS unit will be used if a personal emergency occurs.

FIG. 1 illustrates an enhanced personal emergency response system (e-PERS) unit 100. A standard or legacy base unit PERS typically comprises a console connected to a user's phone that can communicate with a response center through a two-way voice and data signaling with a central station. It is typically activated by a transmitter worn on person.

The e-PERS unit 100 can include additional hardware and software that can enable the e-PERS unit to provide additional functionality to users and home health care providers. The e-PERS unit can include a plurality of radio access technologies (RATs) that can enable the e-PERS unit to communicate with multiple different types of wireless devices, via both wireless local area networks (W-LANs) and wireless wide area networks (W-WANs). The e-PERS unit can also be configured communicate using the plain old telephone service (POTS).

Each RAT can include the use of one or more antennas. The antennas may be located internal to the e-PERS unit. Alternatively, one or more RATs can share an antenna. The one or more antennas can be configured to communicate with a node or transmission station, such as an access point (AP), a base station (BS), an evolved Node B (eNB), a next generation Node B (gNB), a new radio (NR), a baseband unit (BBU), a remote radio head (RRH), a remote radio equipment (RRE), a relay station (RS), a radio equipment (RE), a remote radio unit (RRU), a central processing module (CPM), or other type of W-WAN access point. The e-PERS unit can communicate using separate antennas for each wireless communication standard or shared antennas for multiple wireless communication standards. The wireless device can communicate in a wireless local area network (WLAN), a wireless personal area network (WPAN), and/or a WWAN.

The e-PERS unit 100 can also include a graphical user interface (GUI). In one example, the GUI can be viewed and controlled using a display screen 110 such as a touchscreen. The touchscreen can enable a user to interact with the GUI. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user or service provider. The non-volatile memory port can also be used to expand the memory capabilities of the wireless device. A virtual keyboard can also be provided using the touch screen. The ability of the user to interact with the GUI allows the e-PERS unit to be used for a wide variety of things related to home healthcare, emergency responses, interaction with friends and family, fall detection, motion activity, temperature measurement, and so forth.

The e-PERS unit 100 can include a speaker 120 used to provide voice and audio from the e-PERS unit. In addition, the e-PERS unit can also include a microphone 130. The microphone can be a simple microphone configured to pick up audio signals. Alternatively, the microphone can include one or more digital or analog microphones that can be used to filter audio signals and allow full duplex or half duplex communication from the e-PERS unit 100. In addition, the digital microphones can be configured to provide more accurate voice communication to the e-PERS unit 100. The e-PERS unit 100 can be configured to provide voice recognition to enable the e-PERS unit to be operated using voice. Alternatively, the e-PERS unit can be connected to a computing service environment (CSE) and a CSE-based program can be used to provide voice recognition capabilities for the e-PERS unit. In one embodiment, a monitoring center can control the e-PERS unit and configure the e-PERS unit to be in either a simplex mode (in which the user or the monitoring center can either talk or listen) or a duplex mode (in which the monitoring center and the user can both talk and listen at the same time).

The e-PERS unit 100 can also include a help button 140. The help button can be configured to send a predetermined message to a selected destination, such as an emergency response center. The emergency response center can then use the speaker 120 and/or display screen 110 to respond to the emergency signal, sent by the user, and to communicate with the user. The predetermined message can include data that can be used by the CSE and/or the emergency response center. This will be discussed more fully in the proceeding paragraphs.

The e-PERS unit 100 can also include one or more processors and memory that can be used to operate software, firmware, and hardware functionality at the e-PERS unit. The firmware of one or more processors and memory can be upgraded as new software and firmware functionality becomes available. This can significantly reduce the need for frequent hardware upgrades to the e-PERS unit and reduce costs to healthcare providers and the users. Additional hardware and functionality can also be included in the e-PERS unit. The additional hardware and functionality, along with further details regarding the e-PERS unit, will be disclosed in more details in the proceeding paragraphs.

In one embodiment, the display screen 110 can be set at an angle that enables people to view the screen from a number of locations, such as standing, sitting, or lying in a bed or on the couch. For example, the display screen 110 can be set at an angle of approximately 65 degrees relative to the surface on which the e-PERS unit 100 is set. This example is not intended to be limiting. The display screen can be angled between 5 degrees and 90 degrees relative to the surface, depending on the desired use of the e-PERS unit.

In one embodiment, the e-PERS unit 100 can include modular connection points 150, 160, 170. The modular connection points 150, 160, 170 can allow a relatively low cost PERS to be expanded with W-LAN communication capabilities, wired connections such as a POTS connection or a CAT 5 connection, and/or other desired types of expansion modules. The modular connection points 150, 160, 170 can include a connection point for a module containing a W-WAN transceiver to be connected with the e-PERS unit to wirelessly send and receive W-WAN signals. The modular connection points can also include a connection point for a module containing a W-LAN transceiver to be connected with the e-PERS unit to wirelessly send and receive W-LAN signals, such as Wi-Fi or Bluetooth. The modular connection points 150, 160, 170 can also include a connection point for a module with the capability to send and receive signals via plain old telephone service (POTS). The modular connection points 150, 160, 170 can also include other modules to expand the functionality of the e-PERS unit as desired by a user or a health care provider.

In another example, the e-PERS unit 100 can also include dual subscriber identity module (SIM) slots 180, 190 that allow for dual-connectivity to a provider of a cellular communication system. Each provider can own and operate certain cell towers at selected locations. The selected locations may be near or far from the e-PERS unit. Because the signal strength can vary, depending on the location of the wireless carrier's cell towers, it can be useful to have the option of using multiple carriers. For example, if carrier A has a higher signal strength at location X than carrier B does at location X, then the dual carrier feature can be used to utilize carrier A at location X. However, if the user moves to a different location, Y, and the signal strength of carrier A is lower than the signal strength of carrier B at location Y, then the dual connectivity feature can be used to utilize carrier B at location Y. In addition, it may be possible to send selected data through one or more carriers based on real time signal strength. For example, a received signal strength indicator (RSSI) can be used to determine which carrier has the best signal strength in real time, and adjust communications accordingly. Therefore, dual-connectivity can reduce the chances that the signal strength of a W-WAN communication system will be too low at a particular time or location and increase the probability of a successful communication using the W-WAN communication system.

In order to use an e-PERS unit 100 with dual connectivity, it may be necessary to have a contract with two service providers at the same time. The contract may be based on data usage associated with each service provider. For example, if one service provider is relatively far away, typically has a low RSSI, and is infrequently used, the fee for using that service provider may be relatively small. Alternatively, if the two service providers are used relatively equally, the cost of each service provider may be relatively equal. The overall cost of using two service providers may be greater than the use of a single service provider. However, the benefits to a dealer or healthcare provider of having an e-PERS unit with dual connectivity, as previously described, can be greater than the additional cost.

Figure 2:
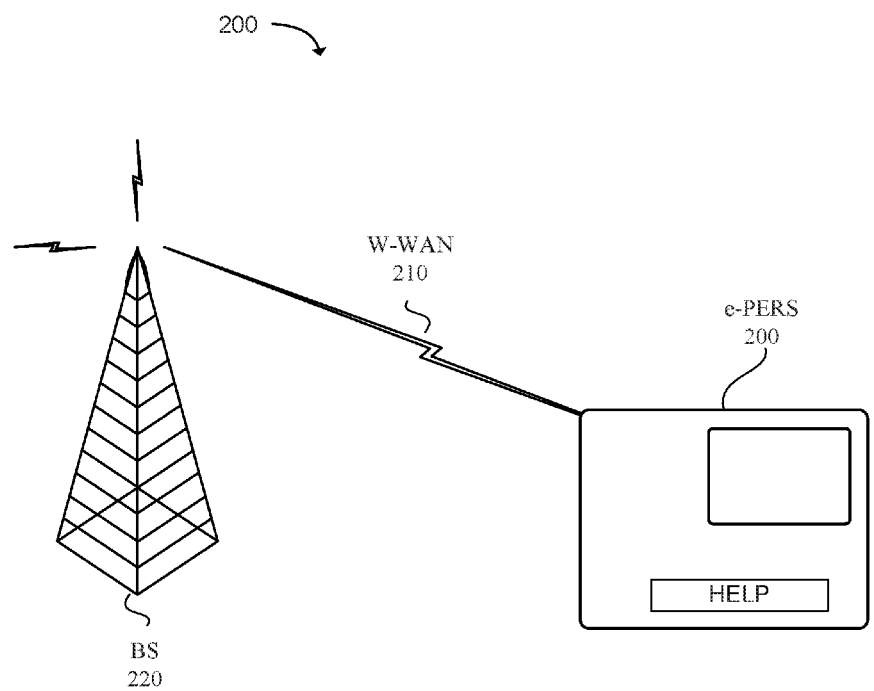
FIG. 2 illustrates an e-PERS unit with a wireless wide area network (W-WAN) radio access technology (RAT) in accordance with an example.

FIG. 2 illustrates an e-PERS unit 200 configured with a radio access technology (RAT) comprising a W-WAN transceiver to wirelessly send and receive W-WAN signals 210 with a base station 220 in a cellular network. In one example, the e-PERS can be configured to communicate with a cellular network using a third generation partnership project (3GPP) long term evolution (LTE) configured RAT. Examples of current 3GPP LTE releases include Release 8, 9, 10, 11, 12 13 or 14. A RAT based on other types of W-WAN standards, such as the IEEE 802.16 standard, may be used as well. Examples of currently released IEEE 802.16 standards include IEEE 802.16e and 802.16m. One or more of the RATs can also be configured to communicate via third generation (3G) or $2^{nd}$ generation (2G) cellular communications standards. In addition, the e-PERS can be configured to communicate using fifth generation (5G) cellular standards to enable broadband communication, as well as energy efficient, small data type communications using the internet of things (IOT) or other types of machine type communications (MTC).

The e-PERS unit 200 can include one or more W-WAN configured RATs to enable communication from the e-PERS unit to locations outside of the home or building in which the e-PERS is located. For example, wireless communication between the e-PERS unit and an emergency response center or a home healthcare provider can be accomplished using the W-WAN. This can enable the e-PERS to be used at substantially any location, without the need for a POTS landline or other type of wired connection. In one embodiment, the e-PERS unit can include both a wired connection, such as POTS, and a W-WAN connection. If one of the connections is not properly functioning, the other connection can act as a backup. Alternatively, the W-WAN connection can be used as a primary connection. The W-WAN connection can enable the e-PERS unit to communicate voice and data with a CSE and/or an emergency response center, as illustrated in FIG. 3.

Figure 3:
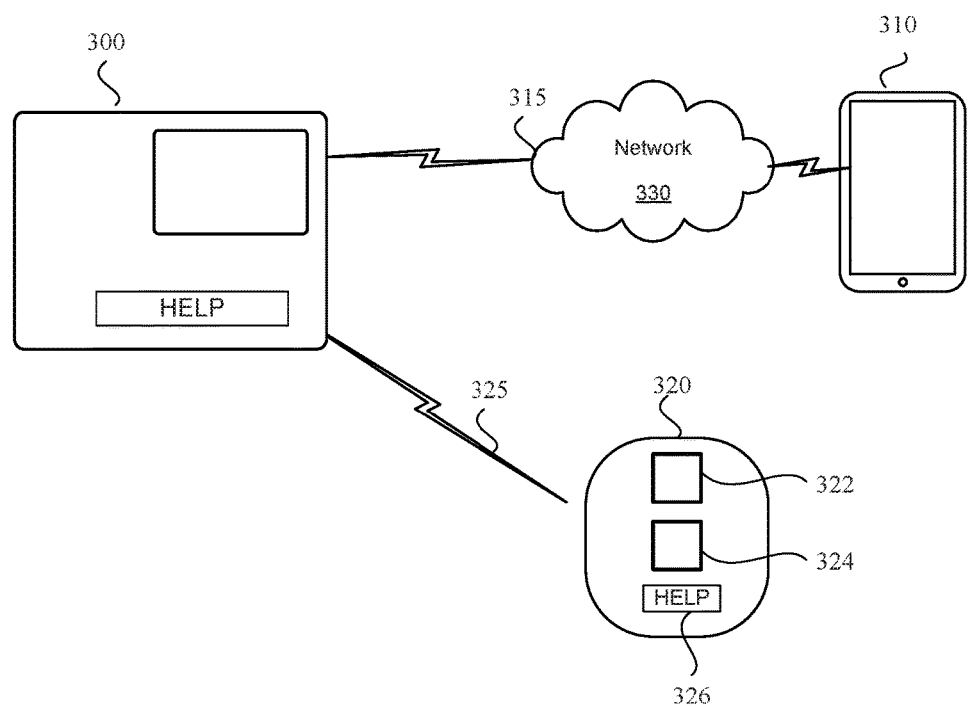
FIG. 3 illustrates an e-PERS unit with one or more wireless local area network (W-LAN) radio access technologies or wireless personal area network (W-PAN) (RATs) in accordance with an example.

FIG. 3 illustrates an e-PERS unit 300 configured with one or more RATs to communicate via a W-WAN, W-LAN or a wireless personal area network (W-PAN). The e-PERS 300 can be configured to communicate with one or more wireless devices 310, 320 through a direct connection, a Near-Field Communication (NFC) configured RAT, a Bluetooth v4.0, Bluetooth Low Energy, Bluetooth v4.1, or Bluetooth v4.2 configured RAT, an Ultra High Frequency (UHF) configured RAT, an Institute of Electronics and Electrical Engineers (IEEE) 802.11a, IEEE 802.11b, IEEE 802.11g, IEEE 802.11n, IEEE 802.11ac, or IEEE 802.11ad configured RAT, a TV White Space Band (TVWS) configured RAT, or any other industrial, scientific and medical (ISM) radio band configured RAT. Examples of such ISM bands include 2.4 GHz, 3.6 GHz, 4.9 GHz, 5 GHz, 5.9 GHz, or 61 GHz. The use of high frequency bands can allow data to pass at high rates between the e-PERS unit 300 and multiple wireless devices 310, 320. The W-LAN and/or W-PAN can also be used to backup communications over the W-WAN.

In one embodiment, the e-PERS unit 300 can be operated as a base e-PERS that is typically configured to be placed at a single location. The base e-PERS is typically plugged in to a wall power source. The base e-PERS can also be connected to a wired network connection, such as a category type 5 (CAT 5) or category type 6 (CAT 6) cable, a radio frequency (RF) cable, a shielded cable, or another type of wired connection. The base e-PERS can also include a battery that can be used to provide backup power to the e-PERS in the event of a power outage. The battery can be a primary battery or a rechargeable battery, such as a lead-acid, nickel cadmium, nickel metal hydride, lithium ion, lithium ion polymer, or another desired type of battery. The battery size can be selected to provide a desired backup time. For example, the battery size may be selected to provide power to the e-PERS for 1 hour, 5 hours, 24 hours, 36 hours, 90 hours, 172 hours, or another desired time frame. In one embodiment, the functionality of the e-PERS may be reduced when the e-PERS is operating using the battery backup. The base e-PERS can include an openable compartment in which the backup battery is located. This can enable a user or healthcare professional to replace the battery within the e-PERS. The e-PERS can include battery overcharge and discharge protection to maximize a life of the battery.

One or more W-WAN, W-LAN or W-PAN RATs in the e-PERS unit 300 can be used to communicate with one or more wireless devices. For example, a W-LAN 315 or W-PAN 325 connection can be used to communicate between a base e-PERS and a personal help button 320. The personal help button 320 may be a standard PERS button, such as a fall risk pendant, which is simply configured to communicate an emergency signal and/or audio between the button and a base e-PERS. The personal help button can be a mobile button, configured to be worn by a user, or a fixed button, designed to be placed in high risk areas such as in a shower or near a user's bed.

In one embodiment, the e-PERS unit 100, 200, 300 can be configured to dock with a mobile PERS or mobile e-PERS 310. The docking station can provide power and/or data communication between the e-PERS and the mobile PERS or mobile e-PERS.

In one embodiment, the e-PERS unit 100, 200, 300 can be configured to communicate with a plurality of personal help buttons 320. Each of the personal help buttons 320 can include an emergency communication button. The emergency communication button can be a physical button, or a virtual button on a touch screen or other type of electrical detection device. Each of the personal help buttons 320 can include a speaker 322 and a microphone 324. When the emergency communication button is activated at the e-PERS unit 100, 200, 300 or personal help buttons, the speakers and microphones on each of the devices can be activated to more easily receive sound from the user and provide audio to the user.

The personal help button 320, when activated by the user, can communicate with the e-PERS unit 100, 200, 300. The e-PERS unit 100, 200, 300 can communicate with a computing service environment (CSE) or a monitoring station in order to notify the monitoring station that a personal emergency is occurring. The personal help button can be a pendant worn around the neck, a small device worn on a belt, a wristband, a mobile phone, a tablet, or any other electronic device that is able to send a desired signal to the e-PERS unit 100, 200, 300.

In another example, a user's personal help button can be remotely programmed to pair with the e-PERS unit 100, 200, 300. Each personal help button can be configured to transmit a specific RF code associated with a serial number of the personal help button. In one example, the serial number of the personal help button can be entered into a computing service environment. Each personal help button can have the serial number on the outside of the button or otherwise associated with the button. A person can login to a web portal of a computer service environment. The person can identify the user's e-PERS unit 100, 200, 300 in the web portal by searching for the serial number of the e-PERS unit 100, 200, 300, the user's name, or the ID of the e-PERS unit 100, 200, 300. The person can enter the serial number of the personal help button into the appropriate field within the web portal. The computing service environment can find an RF code associated with a specific personal help button in a database. The RF code can be sent to the e-PERS unit 100, 200, 300 immediately or the RF code can be sent to the e-PERS unit 100, 200, 300 upon the next Ping from the e-PERS unit 100, 200, 300. The e-PERS unit can then associate a received RF code with a specific personal help button. The specific personal help button can be associated with a specific use or location for a user. For example, a first personal help button can be a pendant worn by a user, and a second personal help button can be at a fixed location in the user's shower. When the e-PERS unit receives the specific RF code from the personal help button, it can be determined where the personal help button associated with the RF code is located or used. Selected information, such as the RF code or personal help button serial number, can then be passed on by the e-PERS unit to the network 330.

In another example, a command can be sent from the network 330, such as the computing service environment, to the e-PERS unit 100, 200, 300 that places the e-PERS unit 100, 200, 300 into a programming mode. In one example, a person can login to a web portal of the computing service environment. The person can search for the user's e-PERS unit 100, 200, 300 in the web portal by the serial number of the e-PERS unit 100, 200, 300, the user's name, or the ID of the e-PERS unit 100, 200, 300. The person can instruct the e-PERS unit by entering the appropriate instruction in the computing service environment. An audible alert can confirm that the e-PERS unit is in programming mode. A user can activate the personal help button and another audible alert will confirm that the personal help button is paired with the e-PERS unit.

The speakers 322 and microphone 324 can be configured to allow both the personal help button 320 and e-PERS unit 100, 200, 300 to use sound canceling algorithms so that there are no strong echoes or double voice sounds when multiple devices are operating simultaneously. The ability to operate multiple personal help buttons simultaneously can enhance the ability to communicate with a user and to respond accurately to an emergency communication.

In addition, the e-PERS unit 300 can be configured to communicate with one or more wireless devices, such as user equipment (UEs) or mobile stations (MS). The wireless devices can include cell phones, tablets, tablet computers, laptop computers, desktop computers, and other types of computing devices. The wireless devices can be configured to communicate using a selected RAT, such as Wi-Fi or Bluetooth. In one embodiment, the wireless devices can be paired with the e-PERS.

The wireless devices can be used to communicate messages, text messages, audio, pictures, video, and data to the e-PERS unit 300. The wireless devices can communicate these messages, text messages, audio, pictures, video, and data to the network 330, such as a computing service environment, via a graphical user interface (GUI) operating through an application program interface (API). The network can comprise one or more servers connected via a private or public network, such as a WWAN or an internet connection. In another example, the network can comprise a computing service environment. The network can then communicate this information to the e-PERS, or the information can be retrieved by the e-PERS unit from the network, such as the computing service environment. The use of an API allows different types of wireless devices and monitoring stations to communicate information to an e-PERS unit. This allows different health care providers using different operating systems and equipment to still be able to efficiently communicate with the e-PERS unit via the network, such as a computing service environment. This can also allow the user's family members, caregivers, friends and other contacts to interact with the user via a GUI that operates through an API.

The display screen of the e-PERS can be used to display time, date, a received signal strength indicator for one or more RATs, weather information, battery information, for the internal battery, family slide shows, dealer logos, menu driven options, or other types of customizable on-screen functions.

For example, a healthcare worker, or other type of party, located near an e-PERS unit 300 can update the software or firmware of the e-PERS, send a message to the e-PERS, and/or program the e-PERS to provide a message, image, or video for the user of the e-PERS. In one example, a healthcare worker can use a cell phone or tablet to configure a patient's e-PERS to provide healthcare information to a user of the e-PERS. The healthcare information can include messages, reminders, images, or video instructions related to the patient's healthcare. Examples of healthcare information can include timely reminders to take medicine, change bandages, contact a healthcare provider, visit the doctor or a healthcare provider, and so forth. This information can be communicated via a GUI operating through an API to communicate the information to the network 330, which can then communicate the information to the e-PERS unit 300.

The W-LAN and/or W-PAN wireless RAT connections 315, 325 can also be used by non-healthcare workers to send information to the e-PERS unit 300. For example, family members or friends can use programs operating on mobile devices 310 to communicate desired information to the e-PERS. This may include healthcare type information, such as reminders to take medicines or go to doctor's appointments. For example, a family member may use a cell phone to setup reminders on the e-PERS to remind a user to take non-prescription or prescription medicines. Family and friends can also send pictures and social media information to a user for display on the e-PERS unit. This information can be communicated via a GUI operating through an API to communicate the information to the network 330, which can then communicate the information to the e-PERS unit 300.

In another example, a remotely located healthcare worker, family, or friends can send healthcare information to the e-PERS for display to the user using the W-WAN. For example, using an app operating on a cell phone or tablet, a cloud based program, a web portal, or a remote server, a remotely located healthcare worker can send healthcare information for display by the e-PERS using the W-WAN configured RAT. Family or friends may use a web portal (i.e. a graphical user interface operating in a web browser on the internet) to send pictures, videos, social media information, or healthcare related information for display to the user on the e-PERS. The web portal can have multiple backups and be configured to operate a very high percentage of time, such as 99%, 99.99%, 99.9999%, and so forth. This information can also be communicated via a GUI operating through an API to communicate the information to the network 330, which can then communicate the information to the e-PERS unit 300.

Healthcare workers, family, friends, and the user of the e-PERS can also setup and operate the e-PERS using the touch screen. The e-PERS can include a GUI and operating system that allow reminders to be set, as well as images or other types of audio visual information to be displayed in the background, foreground, or over a portion of the screen.

In summary, the functionality and operations of the e-PERS unit 100, 200, 300 can be controlled and operated locally using a touch screen on the e-PERS, or a W-LAN connection or W-PAN connection with a remote device, or controlled and operated remotely using a W-WAN connection or the W-LAN connection or W-PAN connection and a web portal or other type of program operating in a computing service environment. The touch screen can enable a user to interact with a response center, in the event of an emergency. For example, the user may not be able to talk, but may still be able to touch a portion of the screen. This can enable the response center to obtain additional information from a user in the event of an emergency. For example, a user may select from a screen that they are choking, or having a heart attack. Emergency responders can then be prepared when they arrive and provide a quicker, better response for the user. The touch screen may also be helpful to reduce the number of false alarms.

Accordingly, the e-PERS unit 100, 200, 300 can provide additional functionality over merely enabling a user to report a medical emergency. The e-PERS can operate as an intelligent telehealth hub that can communicate with other hubs and allow healthcare providers, family, friends, and/or users to provide information that improve a user's healthcare.

Figure 4:
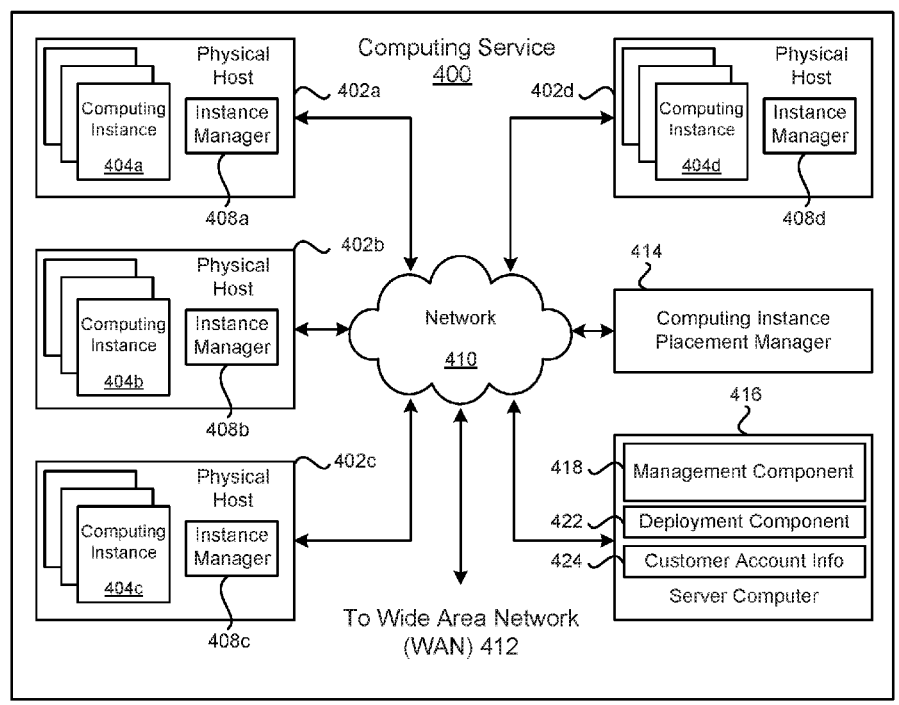
FIG. 4 illustrates a block diagram that illustrates an example computing service environment (CSE).

FIG. 4 is a block diagram illustrating an example computing service 400 that may be used to execute and manage a number of computing instances 404*a-d*. In particular, the computing service 400 depicted illustrates one environment in which the technology described herein may be used. The computing service 400 may be one type of environment that includes various virtualized service resources that may be used, for instance, to host computing instances 404*a*-i d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a computing instance placement manager that may perform functions, such as querying the server computers 402a-d for available computing slots and computing group state information, as well as determining a placement of a computing instance 404a-d in an available computing slot.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
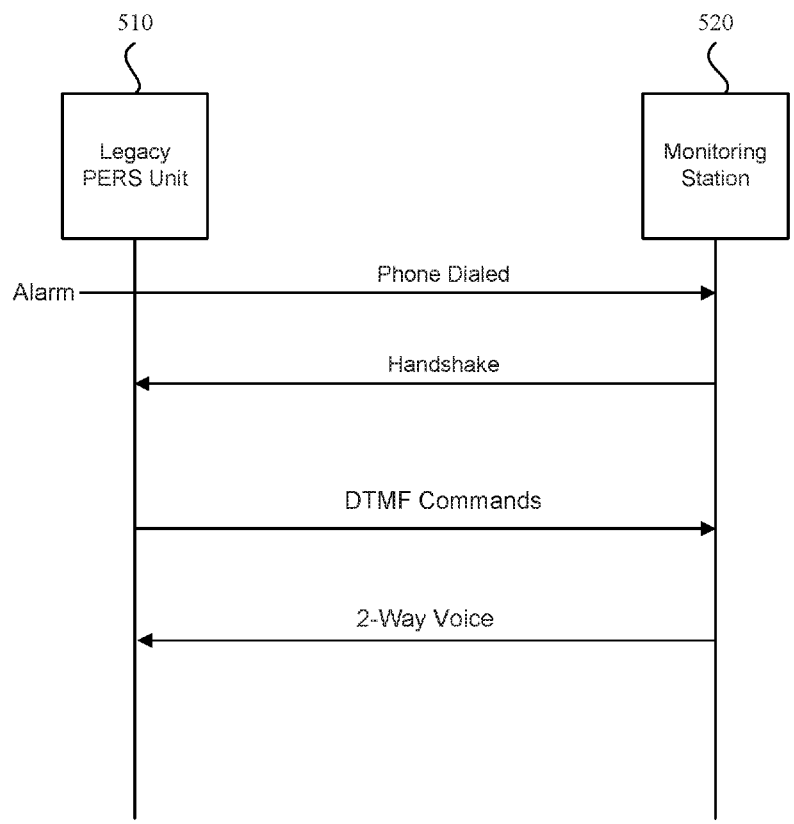
FIG. 5 illustrates a diagram of a legacy PERS unit and a monitoring station in accordance with an example.

FIG. 5 provides an example of the communication between a legacy PERS unit and a monitoring station. The legacy PERS unit can include an alarm that can be triggered by a user. In response to the triggering of the alarm, a voice or data connection can be formed between the PERS unit and the monitoring station. The monitoring station can initiate a handshake protocol with the legacy PERS unit. In response to the handshake protocol, several dual-tone multi-frequency (DTMF) commands can be sent back to the monitoring station. At this point in the process, a 2-way voice call can be initiated between the user and the monitoring station. This process can take longer than 15 seconds because of the nature of the steps involved.

Figure 6:
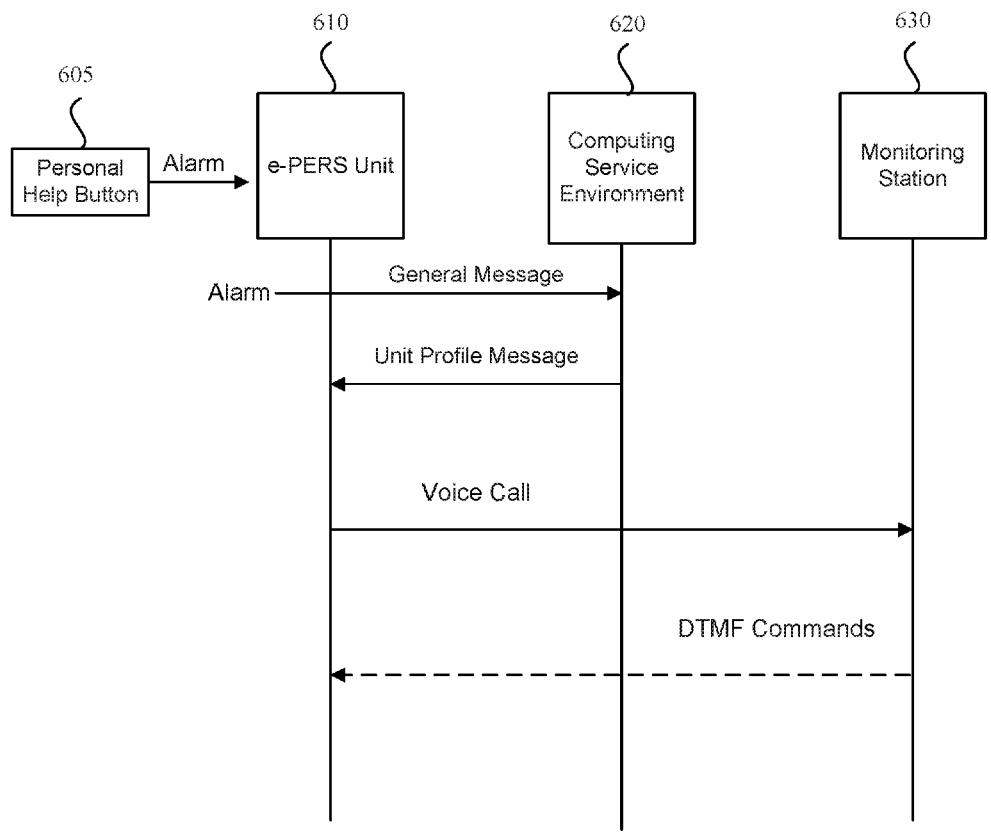
FIG. 6 illustrates a diagram of an e-PERS unit, a computing service environment, and a monitoring station in accordance with an example.

FIG. 6 provides an example diagram of the communication flow between an e-PERS unit 610, a computing service environment 620, and a monitoring station 630. A user can report an emergency by activating the alarm feature at the personal help button 605 and/or the e-PERS unit 610. The user can also activate different devices connected to the e-PERS unit 610. As previously discussed, the personal help button can be configured as a pendant worn around the neck, a small device worn on a belt, a wristband, a mobile phone, a fixed location device, or any other device that is able to be activated by a user and activate the e-PERS unit. Upon activation, a general message can be transmitted from the e-PERS unit to the computing service environment 620. The general message can include an identification of the e-PERS unit and/or an identification of the personal help button. The ID can allow the computing service environment 620 to identify the e-PERS unit or personal help button that transmitted the general message. Based on this identification, the computing service environment 620 can create a unit profile message and an incident record can be created. The unit profile message can be transmitted back to the e-PERS unit 610 from the computing service environment 620. After receiving the unit profile message from the computing service environment 620, the e-PERS unit 610 can use the information provided by the CSE in the unit profile message to open a voice channel and/or data channel with the monitoring station 630. The voice channel can be configured using voice over LTE (VoLTE), voice over internet protocol (VoIP) or a 3G backup if VoLTE or VoIP is not available. A caller ID associated with the e-PERS unit can be sent from the e-PERS unit to the monitoring station. The monitoring station 630 can use the caller ID and/or the device ID of the e-PERS unit to process the voice channel. This process can take less than one second to complete.

Figure 7:
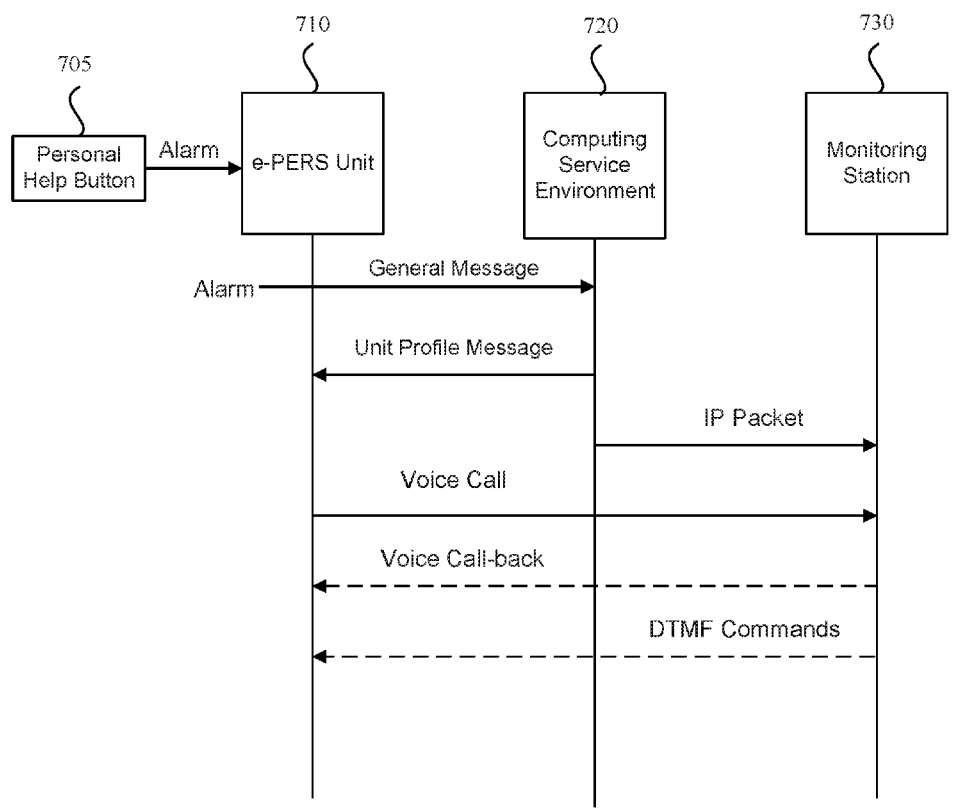
FIG. 7 illustrates a diagram of an e-PERS unit, a computing service environment, and a monitoring station in accordance with an example.

FIG. 7 provides another example diagram of the data flow between an e-PERS unit 710, a computing service environment 720, and a monitoring station 730. A user can report an emergency by activating the alarm feature of the e-PERS unit 710 either directly at the e-PERS unit, or via a signal from a personal help button communicated to the e-PERS unit. Upon activation, a general message can be transmitted from the e-PERS unit to the computing service environment 720. The general message can include an identification of the e-PERS unit and/or the personal help button that was activated to report the emergency. The ID of the e-PERS unit and/or personal help button can allow the computing service environment 620 to identify the e-PERS unit that transmitted the general message. Based on this identification, the computing service environment 620 can create a unit profile message and an incident record can be created. The unit profile message can be transmitted from the back to the e-PERS unit 710 from the computing service environment 720. After the computing service environment 720 has transmitted the unit profile message to the e-PERS unit 710, an internet protocol (IP) packet, containing the e-PERS unit ID, can be transmitted from the computing service environment 720 to the monitoring station 730. At the monitoring station 730, the IP packet, containing the e-PERS unit ID, can be used to associate the e-PERS ID with the caller ID. After the IP packet has been transmitted to the monitoring station, a voice channel can be directly opened from the e-PERS unit 710 to the monitoring station 730 based on the information provided by the CSE to the e-PERS unit in the unit profile message. The voice channel can be configured using voice over LTE (VoLTE), voice over internet protocol (VoIP) or a 3G backup if VoLTE or VoIP is not available. A caller ID associated with the e-PERS unit can be sent from the e-PERS unit to the monitoring station. The e-PERS unit ID can be associated with the caller ID at the monitoring station. Optionally, after the voice channel has been opened to the monitoring station 730, the monitoring station 730 can open a voice channel to the e-PERS unit 710. As another option, the monitoring station 730 can issue DTMF commands from the monitoring station 730 to the e-PERS unit 710.

Figure 8:
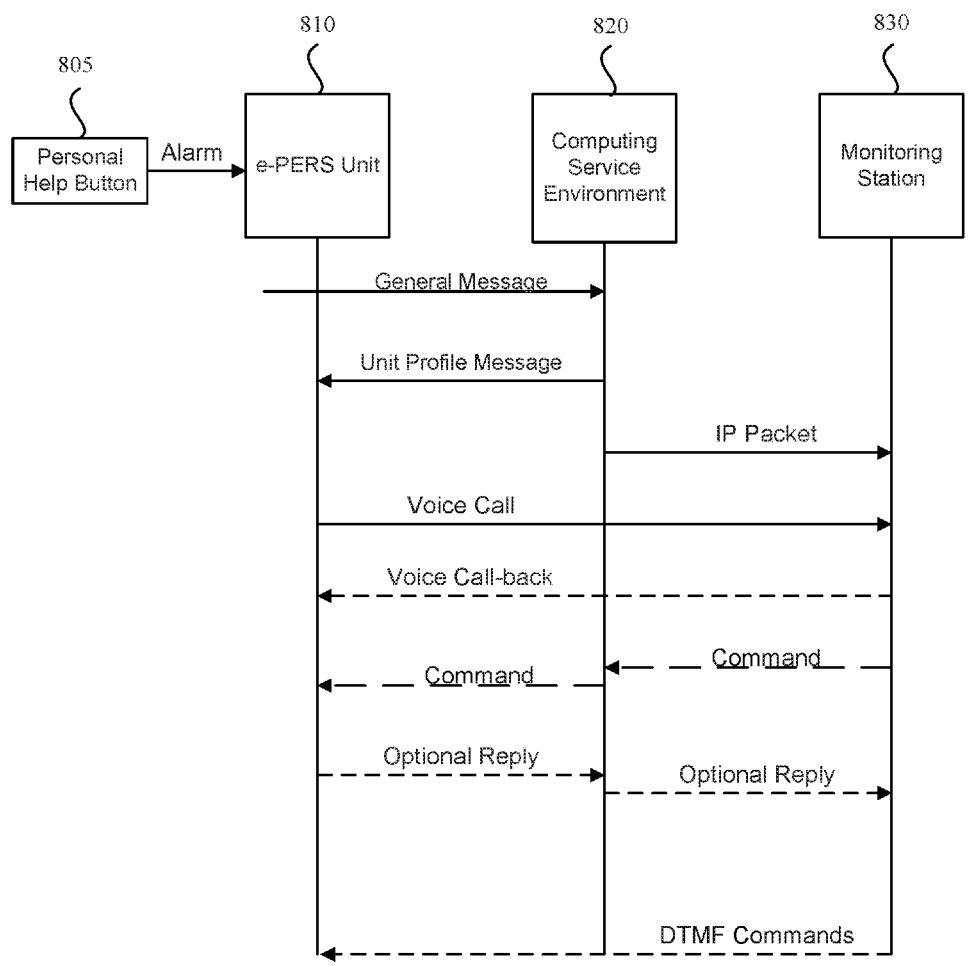
FIG. 8 illustrates a diagram of an e-PERS unit, a computing service environment, and a monitoring station in accordance with an example.

FIG. 8 provides another example diagram of the communication flow between an e-PERS unit 810, a computing service environment 820, and a monitoring station 830. A user can report an emergency by activating the alarm feature of the e-PERS unit 810 using the e-PERS unit itself, or a connected personal help button. Upon activation, a general message can be transmitted from the e-PERS unit to the computing service environment 820. The general message can include an identification of the e-PERS unit and/or the personal help button. The ID of the e-PERS unit can allow the computing service environment 620 to identify the e-PERS unit that transmitted the general message. Based on this identification, the computing service environment 820 can create a unit profile message and an incident record can be created. The unit profile message can be transmitted back to the e-PERS unit 810 from the computing service environment 820. After the computing service environment 820 has transmitted the unit profile message to the e-PERS unit 810, an internet protocol (IP) packet, containing the e-PERS unit ID, can be transmitted from the computing service environment 820 to the monitoring station 830. After the IP packet has been transmitted to the monitoring station, a voice channel can be directly opened from the e-PERS unit 810 to the monitoring station 830. The voice channel can be configured using voice over LTE (VoLTE), voice over internet protocol (VoIP) or a 3G backup if VoLTE or VoIP is not available. A caller ID associated with the e-PERS unit can be sent from the e-PERS unit to the monitoring station. At the monitoring station 830, the IP packet, containing the e-PERS unit ID, can be used to associate the e-PERS ID with the caller ID. Optionally, after the voice channel has been opened to the monitoring station 830, the monitoring station 830 can open a voice channel to the e-PERS unit 810. As another option, the monitoring station 830 can issue DTMF commands from the monitoring station 830 to the e-PERS unit 810. In response to receiving these DTMF commands from the monitoring station 830, the e-PERS unit 810 can issue an optional reply to the monitoring station 830. The monitoring station 830 can further respond to this optional reply by transmitting DTMF commands to the e-PERS unit.

The processes referenced above in FIG. 6, 7, 8 can also include a back-up process in which the legacy process referenced in FIG. 5 can be used to establish communication between an e-PERS unit and a monitoring station. For example, if the computing service environment 620, 720, 820 is unable to communicate with the e-PERS unit or the monitoring station 830, then the back-up legacy process can be used instead. It is not desirable to use the legacy process because of the difference in speed between the legacy process and the processes referenced in FIGS. 6, 7, and 8. In addition, the capability of the e-PERS unit can be significantly reduced without communication with the computing service environment 820. However, the legacy process can be utilized by the e-PERS unit nonetheless as a backup service.

The general message referenced above in FIG. 6, 7, 8 can comprise many different types including: Auth, OK, Ping, Message Waiting, Error, Get, Profile, Profile ACK, RFCodes, RFCodes Ack, EVENT, Download Speech, RF Codes Start, ForcePing, GoToMode, GoToMode ACK, and HELP.

An Auth general message can contain an encryption key and the e-PERS unit serial number. It can also include: a message count; the source (such as the e-PERS unit or the computing service environment), and a JavaScript Object Notation (JSON) object. It can be the first message sent to the computing service environment per connection. An OK message can be an acknowledgment message.

A Ping message can contain status bytes about the state of the unit. These status bytes can include information about: the active subscriber identity module (SIM) slots; the AC power status; the type of W-WAN connection; and the battery charge level. The Ping message can also include information about the received signal strength indication (RSSI) or signal strength.

A message waiting message can be sent to the e-PERS unit from the computing service environment. When the e-PERS unit receives this message, then a message can be waiting for the e-PERS unit. The message waiting message can be sent as a response to a Ping message or can be sent to the e-PERS unit when information has changed in the computing service environment in reference to the particular e-PERS unit.

An error message can be sent by the e-PERS unit or the computing service environment to indicate that an error has occurred. A get message can be sent by the e-PERS unit to request the computing service environment to send the next waiting message. A Profile message can be sent from the e-PERS unit to the computing service environment and can contain the current profile stored on the computing service environment. A Profile ACK message can be sent from the e-PERS unit to the computing service environment acknowledging that the profile message has been received by the computing service environment.

An RFCodes message can be sent from the computing service environment or the e-PERS unit and contains RFCodes, types, and zones. When the message is received, the current RF data can be replaced with the data in the message. An RFCodes ACK message can be sent from the e-PERS unit to the computing service environment acknowledging that the RFCodes have been received. A Download Speech message can be sent from the computing service environment to the e-PERS unit instructing the e-PERS unit to download a file from a web server. An RFCodes Start message can be sent from the e-PERS unit to the computing service environment instructing it to prepare to receive RFCodes messages.

A ForcePing message can be sent to the e-PERS unit from the computing service environment requesting the e-PERS unit to issue a ping message. A GoToMode message can be sent to the e-PERS unit from the computing service environment requesting the e-PERS unit to enter a specific mode. A GoToMode Ack message can be an acknowledgment that a GoToMode message has been received.

A HELP message can be sent to various destinations as referenced above in FIG. 6, 7, 8 to indicate that a user has a personal emergency.

Figure 9:
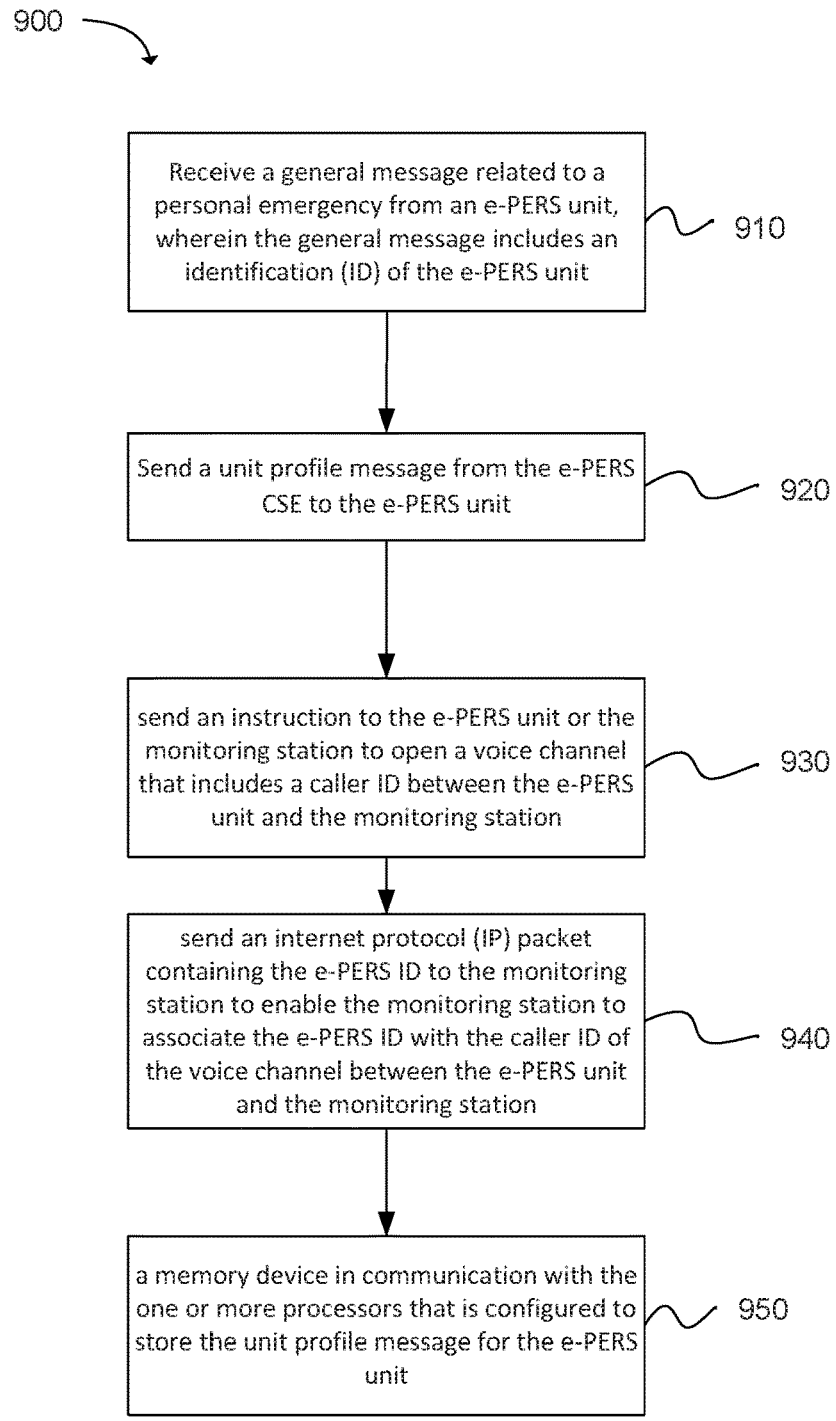
FIG. 9 depicts functionality of an e-PERS computing service environment (CSE) in accordance with an example.

Another example, in FIG. 9 provides a flow chart 900 showing functionality of a computing service environment that can be configured to communicate with an e-PERS unit and a monitoring station. The computing service environment can comprise one or more processors. These one or more processors can be configured to receive a general message related to a personal emergency from a e-PERS unit, wherein the general message includes an identification (ID) of the e-PERS unit, as in block 910. These one or more processors can be further configured to send a unit profile message from the e-PERS CSE to the e-PERS unit, as in block 920. These one or more processors can be further configured to send an instruction to the e-PERS unit or the monitoring station to open a voice channel that includes a caller ID between the e-PERS unit and the monitoring station, as in block 930. These one or more processors can be further configured to send an internet protocol (IP) packet containing the e-PERS ID to the monitoring station to enable the monitoring station to associate the e-PERS ID with the caller ID of the voice channel between the e-PERS unit and the monitoring station, as in block 940. The computing service environment can further comprise a memory device in communication with the one or more processors that is configured to store the unit profile message for the e-PERS unit, as in block 950.

Figure 10:
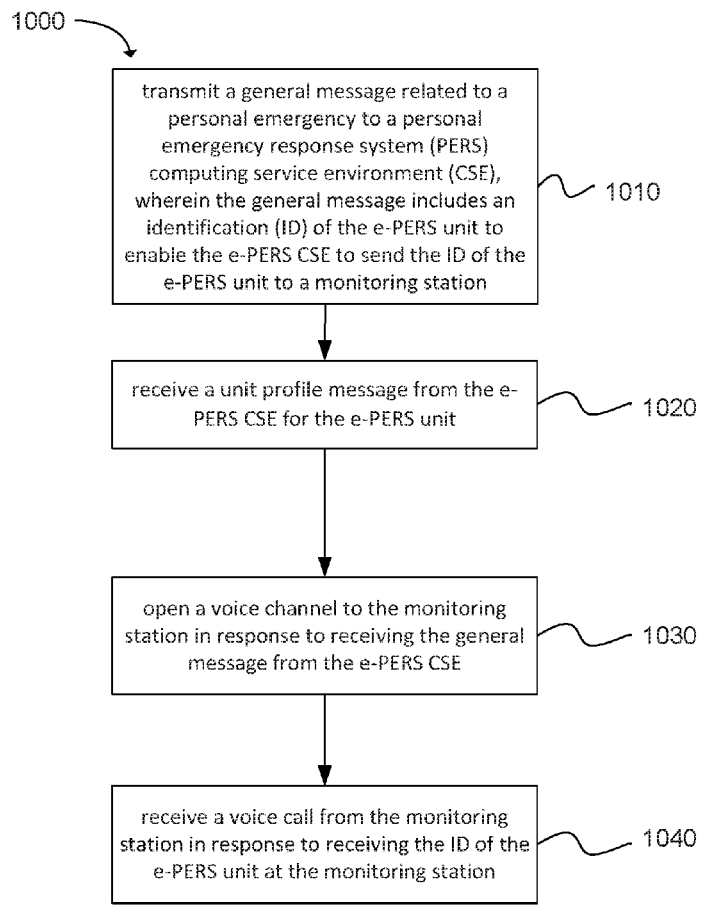
FIG. 10 depicts functionality of an e-PERS unit in accordance with an example.

Another example, in FIG. 10 provides a flow chart 1000 showing functionality of an e-PERS unit that can be configured to communicate with computing service environment and a monitoring station. The e-PERS unit can comprise one or more processors. These one or more processors can be configured to transmit a general message related to a personal emergency to a personal emergency response system (PERS) computing service environment (CSE), wherein the general message includes an identification (ID) of the e-PERS unit to enable the e-PERS CSE to send the ID of the e-PERS unit to a monitoring station, as in block 1010. These one or more processors can be further configured to receive a unit profile message from the e-PERS CSE for the e-PERS unit, as in block 1020. These one or more processors can be further configured to open a voice channel to the monitoring station in response to receiving the general message from the e-PERS CSE, as in block 1030. These one or more processors can be further configured to open a voice channel from the monitoring station in response to receiving the ID of the e-PERS unit at the monitoring station, as in block 1040. The e-PERS unit can further comprise a display screen configured to display information including information received from the e-PERS CSE, and a personal help button configured to transmit the general message via the one or more processors to the e-PERS CSE. The e-PERS CSE can send and receive data from a plurality of e-PERS devices. In one embodiment, hundreds or thousands of e-PERS devices can communicate with the e-PERS CSE. A variety of different types of data can be communicated between the e-PERS CSE relating to the health status of each e-PERS device, client information, billing information, social information, and health service provider information, as previously discussed.

EXAMPLES

The following examples pertain to specific technology embodiments and point out specific features, elements, or actions that can be used or otherwise combined in achieving such embodiments.

Example 1 includes a personal emergency response system (PERS) computing service environment (CSE) comprising: one or more processors configured to: receive a general message related to a personal emergency from an enhanced PERS (e-PERS) unit, wherein the general message includes an identification (ID) of one or more of the e-PERS unit or a personal help button; send a unit profile message from the e-PERS CSE to the e-PERS unit; send an instruction to the e-PERS unit or the monitoring station to open a voice channel that includes a caller ID between the e-PERS unit and the monitoring station; send an internet protocol (IP) packet containing the e-PERS ID to the monitoring station to enable the monitoring station to associate the e-PERS ID with the caller ID of the voice channel between the e-PERS unit and the monitoring station; and a memory device in communication with the one or more processors that is configured to store the unit profile message for the e-PERS unit.

Example 2 includes the e-PERS CSE of Example 1, wherein the one or more processors are further configured to receive a ping message from the e-PERS unit, wherein the ping message includes data relating to a status of the e-PERS unit.

Example 3 includes the e-PERS CSE of any of Examples 1 to 2, wherein the one or more processors are further configured to send a message waiting message to the e-PERS unit to inform the e-PERS unit that a message is waiting for the e-PERS unit.

Example 4 includes the e-PERS CSE of any of Examples 1 to 3, wherein the one or more processors are further configured to send an error message to the e-PERS unit or receive an error message from the e-PERS unit to indicate that an error has occurred in a last interaction between the e-PERS unit and the e-PERS CSE.

Example 5 includes the e-PERS CSE of any of Examples 1 to 4, wherein the one or more processors are further configured to receive a get message from the e-PERS unit, wherein the get message requests the server to send a message waiting for the e-PERS unit to the e-PERS unit.

Example 6 includes the e-PERS CSE of any of Examples 1 to 5, wherein the one or more processors are further configured to receive a profile acknowledgement (ACK) message from the e-PERS unit, wherein the profile ACK message indicates that the unit profile message has been received by the e-PERS unit.

Example 7 includes the e-PERS CSE of any of Examples 1 to 6, wherein the one or more processors are further configured to receive a radio frequency (RF) codes message from the e-PERS unit or send an RF codes message to the e-PERS unit.

Example 8 includes the e-PERS CSE of any of Example 1 to 7, wherein the one or more processors are further configured to receive a radio frequency (RF) code acknowledgement (ACK) message from the e-PERS unit to acknowledge that the RF codes message is received.

Example 9 includes the e-PERS CSE of any of Examples 1 to 8, wherein the one or more processors are further configured to send a download message to the e-PERS unit instructing the e-PERS unit to download a file from the e-PERS CSE or a selected server, wherein the file is one or more of an audio file, a text file, a picture file, or a multimedia file.

Example 10 includes the e-PERS CSE of any of Examples 1 to 9, wherein the one or more processors are further configured to send a radio frequency (RF) Codes start message to the e-PERS unit, instructing the e-PERS unit to prepare to receive an RF Codes message.

Example 11 includes the e-PERS CSE of any of Examples 1 to 10, wherein the one or more processors are further configured to send a force ping message to the e-PERS unit to request the e-PERS unit to ping the e-PERS CSE within a predetermined time period.

Example 12 includes the e-PERS CSE of any of Examples 1 to 11, wherein the one or more processors are further configured to send a go-to-mode message to the e-PERS unit, requesting the e-PERS unit to enter a specific mode.

Example 13 includes the e-PERS CSE of any of Examples 1 to 12, wherein the one or more processors are further configured to send one or more of a voice message, a text message, or a video message to the e-PERS unit to be displayed on a display screen of the e-PERS unit.

Example 14 includes an enhanced personal emergency response system (e-PERS) unit, comprising: one or more processors configured to: transmit a general message related to a personal emergency to a personal emergency response system (PERS) computing service environment (CSE), wherein the general message includes an identification (ID) of the e-PERS unit to enable the e-PERS CSE to send the ID of the e-PERS unit to a monitoring station; receive a unit profile message from the e-PERS CSE for the e-PERS unit; and place the voice call to the monitoring station in response to receiving the general message from the e-PERS CSE; or receive a voice call from the monitoring station in response to receiving the ID of the e-PERS unit at the monitoring station; and a display screen configured to display information including information received from the e-PERS CSE; and a base unit help button configured to transmit the general message via the one or more processors to the e-PERS CSE.

Example 15 includes e-PERS unit of Example 14, further comprising a transceiver configured to communicate using a wireless wide area network (W-WAN) radio access technology (RAT) standard or a wireless local area network (W-LAN) radio access technology standard.

Example 16 includes the e-PERS unit of any of Examples 14 to 15, further comprising a modular expansion, wherein the modular expansion is configured to receive a wireless wide area network (W-WAN) radio access technology (RAT) standard module.

Example 17 includes the e-PERS unit of any of Examples 14 to 16, further comprising a modular expansion, wherein the modular expansion is configured to receive a wireless local area network (W-LAN) radio access technology (RAT) standard module.

Example 18 includes the e-PERS unit of any of Examples 14 to 17, further comprising further comprising a modular expansion, wherein the modular expansion is configured to receive a plain old telephone service (POTS) receptor.

Example 19 includes the e-PERS unit of any of Examples 14 to 18, wherein the e-PERS unit is configured to communicate with one or more personal help buttons.

Example 20 includes the e-PERS unit of any of Examples 14-19, wherein the one or more processors are further configured to receive information about the type of communication that is received, wherein the type of communication includes one or more of: voice communication or data communication.

Example 21 includes at least one non-transitory machine readable storage medium having instructions embodied thereon, the instructions when executed by one or more processors at a personal emergency response system (PERS) computing service environment (CSE) perform the following: receiving, at the e-PERS CSE, a general message related to a personal emergency from an enhanced PERS (e-PERS) unit, wherein the general message includes an identification (ID) of the e-PERS unit; sending, at the e-PERS CSE, a unit profile message from the e-PERS CSE to the e-PERS unit; sending, at the e-PERS CSE, an instruction to the e-PERS unit or the monitoring station to open a voice channel that includes a caller ID between the e-PERS unit and the monitoring station; and sending, at the e-PERS CSE, an internet protocol (IP) packet containing the e-PERS ID to the monitoring station to enable the monitoring station to associate the e-PERS ID with the caller ID of the voice channel between the e-PERS unit and the monitoring station.

Example 22 includes the at least one non-transitory machine readable storage medium of Example 21, wherein the instructions when executed by one or more processors at the e-PERS CSE further perform the following: receiving, at the e-PERS CSE, a ping message from the e-PERS unit, wherein the ping message includes data relating to a status of the e-PERS unit.

Example 23 includes the at least one non-transitory machine readable storage medium of any of Examples 20 to 22, wherein the instructions when executed by one or more processors at the e-PERS CSE further perform the following: sending, at the e-PERS CSE, a message waiting message to the e-PERS unit to inform the e-PERS unit that a message is waiting for the e-PERS unit.

Example 24 includes the at least one non-transitory machine readable storage medium of any of Examples 20 to 23, wherein the instructions when executed by one or more processors at the e-PERS CSE further perform the following: sending, at the e-PERS CSE, an error message to the e-PERS unit or receive an error message from the e-PERS unit to indicate that an error has occurred in a last interaction between the e-PERS unit and the e-PERS CSE.

Example 25 includes the at least one non-transitory machine readable storage medium of any of Examples 20 to 24, wherein the instructions when executed by one or more processors at the e-PERS CSE further perform the following: receiving, at the e-PERS CSE, a get message from the e-PERS unit, wherein the get message requests the server to send a message waiting for the e-PERS unit to the e-PERS unit.

Example 26 includes the at least one non-transitory machine readable storage medium of any of Examples 20 to 25, wherein the instructions when executed by one or more processors at the e-PERS CSE further perform the following: receiving, at the e-PERS CSE, a radio frequency (RF) codes message from the e-PERS unit or send an RF codes message to the e-PERS unit.

Example 27 includes the at least one non-transitory machine readable storage medium of any of Examples 20 to 26, wherein the instructions when executed by one or more processors at the e-PERS CSE further perform the following: sending, at the e-PERS CSE, a download message to the e-PERS unit instructing the e-PERS unit to download a file from the e-PERS CSE or a selected server, wherein the file is one or more of an audio file, a text file, a picture file, or a multimedia file.

Example 28 includes the at least one non-transitory machine readable storage medium of any of Examples 20 to 27, wherein the instructions when executed by one or more processors at the e-PERS CSE further perform the following: sending, at the e-PERS CSE, a force ping message to the e-PERS unit to request the e-PERS unit to ping the e-PERS CSE within a predetermined time period.

Example 29 includes the at least one non-transitory machine readable storage medium of any of Examples 20 to 28, wherein the instructions when executed by one or more processors at the e-PERS CSE further perform the following: sending, at the e-PERS CSE, a go-to-mode message to the e-PERS unit, requesting the e-PERS unit to enter a specific mode.

Example 30 includes the at least one non-transitory machine readable storage medium of any of Examples 20 to 29, wherein the instructions when executed by one or more processors at the e-PERS CSE further perform the following: sending, at the e-PERS CSE, one or more of a voice message, a text message, or a video message to the e-PERS unit to be displayed on a display screen of the e-PERS unit.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as baseband processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A personal emergency response system (PERS) computing service environment (CSE) comprising:
   one or more processors configured to:
      receive a general message related to a personal emergency from an enhanced PERS (e-PERS) unit, wherein the general message includes an identification (ID) of one or more of the e-PERS unit or a personal help button;
      send a unit profile message from the e-PERS CSE to the e-PERS unit;
      send an instruction to the e-PERS unit or the monitoring station to open a voice channel that includes a caller ID between the e-PERS unit and the monitoring station;
      send an internet protocol (IP) packet containing the e-PERS ID to the monitoring station to enable the monitoring station to associate the e-PERS ID with the caller ID of the voice channel between the e-PERS unit and the monitoring station; and
   a memory device in communication with the one or more processors that is configured to store the unit profile message for the e-PERS unit.

2. The e-PERS CSE of claim 1, wherein the one or more processors are further configured to receive a ping message from the e-PERS unit, wherein the ping message includes data relating to a status of the e-PERS unit.

3. The e-PERS CSE of claim 1, wherein the one or more processors are further configured to send a message waiting message to the e-PERS unit to inform the e-PERS unit that a message is waiting for the e-PERS unit.

4. The e-PERS CSE of claim 1, wherein the one or more processors are further configured to send an error message to the e-PERS unit or receive an error message from the e-PERS unit to indicate that an error has occurred in a last interaction between the e-PERS unit and the e-PERS CSE.

5. The e-PERS CSE of claim 1, wherein the one or more processors are further configured to receive a get message from the e-PERS unit, wherein the get message requests the server to send a message waiting for the e-PERS unit to the e-PERS unit.

6. The e-PERS CSE of claim 1, wherein the one or more processors are further configured to receive a profile acknowledgement (ACK) message from the e-PERS unit, wherein the profile ACK message indicates that the unit profile message has been received by the e-PERS unit.

7. The e-PERS CSE of claim 1, wherein the one or more processors are further configured to receive a radio frequency (RF) codes message from the e-PERS unit or send an RF codes message to the e-PERS unit.

8. The e-PERS CSE of claim 7, wherein the one or more processors are further configured to receive a radio frequency (RF) code acknowledgement (ACK) message from the e-PERS unit to acknowledge that the RF codes message is received.

9. The e-PERS CSE of claim 1, wherein the one or more processors are further configured to send a download message to the e-PERS unit instructing the e-PERS unit to download a file from the e-PERS CSE or a selected server, wherein the file is one or more of an audio file, a text file, a picture file, or a multimedia file.

10. The e-PERS CSE of claim 1, wherein the one or more processors are further configured to send a radio frequency (RF) Codes start message to the e-PERS unit, instructing the e-PERS unit to prepare to receive an RF Codes message.

11. The e-PERS CSE of claim 1, wherein the one or more processors are further configured to send a force ping message to the e-PERS unit to request the e-PERS unit to ping the e-PERS CSE within a predetermined time period.

12. The e-PERS CSE of claim 1, wherein the one or more processors are further configured to send a go-to-mode message to the e-PERS unit, requesting the e-PERS unit to enter a specific mode.

13. The e-PERS CSE of claim 1, wherein the one or more processors are further configured to send one or more of a voice message, a text message, or a video message to the e-PERS unit to be displayed on a display screen of the e-PERS unit.

14. At least one non-transitory machine readable storage medium having instructions embodied thereon, the instructions when executed by one or more processors at a personal emergency response system (PERS) computing service environment (CSE) perform the following:
   receiving, at the e-PERS CSE, a general message related to a personal emergency from an enhanced PERS (e-PERS) unit, wherein the general message includes an identification (ID) of the e-PERS unit;
   sending, at the e-PERS CSE, a unit profile message from the e-PERS CSE to the e-PERS unit;
   sending, at the e-PERS CSE, an instruction to the e-PERS unit or the monitoring station to open a voice channel that includes a caller ID between the e-PERS unit and the monitoring station; and
   sending, at the e-PERS CSE, an internet protocol (IP) packet containing the e-PERS ID to the monitoring station to enable the monitoring station to associate the e-PERS ID with the caller ID of the voice channel between the e-PERS unit and the monitoring station.

15. The at least one non-transitory machine readable storage medium of claim 14, wherein the instructions when executed by one or more processors at the e-PERS CSE further perform the following:
receiving, at the e-PERS CSE, a ping message from the e-PERS unit, wherein the ping message includes data relating to a status of the e-PERS unit.

16. The at least one non-transitory machine readable storage medium of claim 14, wherein the instructions when executed by one or more processors at the e-PERS CSE further perform the following:
sending, at the e-PERS CSE, a message waiting message to the e-PERS unit to inform the e-PERS unit that a message is waiting for the e-PERS unit.

17. The at least one non-transitory machine readable storage medium of claim 14, wherein the instructions when executed by one or more processors at the e-PERS CSE further perform the following:
sending, at the e-PERS CSE, an error message to the e-PERS unit or receive an error message from the e-PERS unit to indicate that an error has occurred in a last interaction between the e-PERS unit and the e-PERS CSE.

18. The at least one non-transitory machine readable storage medium of claim 14, wherein the instructions when executed by one or more processors at the e-PERS CSE further perform the following:
receiving, at the e-PERS CSE, a get message from the e-PERS unit, wherein the get message requests the server to send a message waiting for the e-PERS unit to the e-PERS unit.

19. The at least one non-transitory machine readable storage medium of claim 14, wherein the instructions when executed by one or more processors at the e-PERS CSE further perform the following:
receiving, at the e-PERS CSE, a radio frequency (RF) codes message from the e-PERS unit or send an RF codes message to the e-PERS unit.

20. The at least one non-transitory machine readable storage medium of claim 14, wherein the instructions when executed by one or more processors at the e-PERS CSE further perform the following:
sending, at the e-PERS CSE, a download message to the e-PERS unit instructing the e-PERS unit to download a file from the e-PERS CSE or a selected server, wherein the file is one or more of an audio file, a text file, a picture file, or a multimedia file.

21. The at least one non-transitory machine readable storage medium of claim 14, wherein the instructions when executed by one or more processors at the e-PERS CSE further perform the following:
sending, at the e-PERS CSE, a force ping message to the e-PERS unit to request the e-PERS unit to ping the e-PERS CSE within a predetermined time period.

22. The at least one non-transitory machine readable storage medium of claim 14, wherein the instructions when executed by one or more processors at the e-PERS CSE further perform the following:
sending, at the e-PERS CSE, a go-to-mode message to the e-PERS unit, requesting the e-PERS unit to enter a specific mode.

23. The at least one non-transitory machine readable storage medium of claim 14, wherein the instructions when executed by one or more processors at the e-PERS CSE further perform the following:
sending, at the e-PERS CSE, one or more of a voice message, a text message, or a video message to the e-PERS unit to be displayed on a display screen of the e-PERS unit.

* * * * *